United States Patent
Shimshoni et al.

(10) Patent No.: US 8,930,127 B2
(45) Date of Patent: Jan. 6, 2015

(54) LOCALIZATION METHOD FOR MOBILE ROBOTS BASED ON LANDMARKS

(75) Inventors: Ilan Shimshoni, Haifa (IL); Igal Loevsky, Jerusalem (IL)

(73) Assignees: Carmel—Haifa University Economic Corp Ltd., Haifa (IL); Technion Research & Development Foundation Ltd., Haifa (IL)

( * ) Notice: Subject to any disclaimer, the term of this patent is extended or adjusted under 35 U.S.C. 154(b) by 694 days.

(21) Appl. No.: 12/668,521

(22) PCT Filed: Jul. 13, 2008

(86) PCT No.: PCT/IL2008/000969
§ 371 (c)(1),
(2), (4) Date: May 18, 2010

(87) PCT Pub. No.: WO2009/007983
PCT Pub. Date: Jan. 15, 2009

(65) Prior Publication Data
US 2010/0256908 A1    Oct. 7, 2010

Related U.S. Application Data

(60) Provisional application No. 60/929,782, filed on Jul. 12, 2007.

(51) Int. Cl.
*G05D 1/02* (2006.01)
*G01S 17/87* (2006.01)
(52) U.S. Cl.
CPC .................................. *G01S 17/875* (2013.01)
USPC ........................................................ 701/300
(58) Field of Classification Search
USPC ........................................................ 701/300
See application file for complete search history.

(56) References Cited

U.S. PATENT DOCUMENTS 5,995,884 A    11/1999   Allen et al.

OTHER PUBLICATIONS

Langelaan et al. "Passive GPS-Free navigation for Small UAVs" IEEE Aerospace Conference, Mar. 2005, p. 1-9.
Betke et al. "Mobile Robot Localization Using Landmarks" IEEE Trans. Robot and Automation, vol. 13, No. 2; Apr. 1997, p. 251-263.
Shimshoni "On Mobile Tobot Localization from Landmark Bearings" IEEE Trans. Robotics and Automation vol. 18, No. 3; 2002, p. 971-976.
International Search Report for International Application No. PCT/IL2008/000969 mailed Nov 20, 2008.
M.A. Fischler et al., "Random Sample Consensus: A Paradigm for Model Fitting with Applications to Image Analysis and Automated Cartography", Communications of the ACM, vol. 24, No. 6, pp. 381-395, Jun. 1981.

*Primary Examiner* — John Pauls
(74) *Attorney, Agent, or Firm* — Pearl Cohen Zedek Latzer Baratz; Mark Cohen

(57) ABSTRACT

A method for estimating the location and orientation of a mobile robot with respect to landmarks whose positions are given using a sensor for measuring bearings of the landmarks with respect to the robot, where bias errors are present. The method comprises using the sensor to obtain bearings the landmarks. The location and orientation of the robot with respect to the landmarks is estimated, based on the measured bearings, and bias errors associated with the measured bearings are corrected to obtain corrected bearings. A correction function is used to finds the minimal sum of squared errors between measured bearings and the corrected bearings. The location and the orientation of the robot is determined to be where the sum of squared errors between measured bearings and the corrected bearings is minimal.

12 Claims, 17 Drawing Sheets

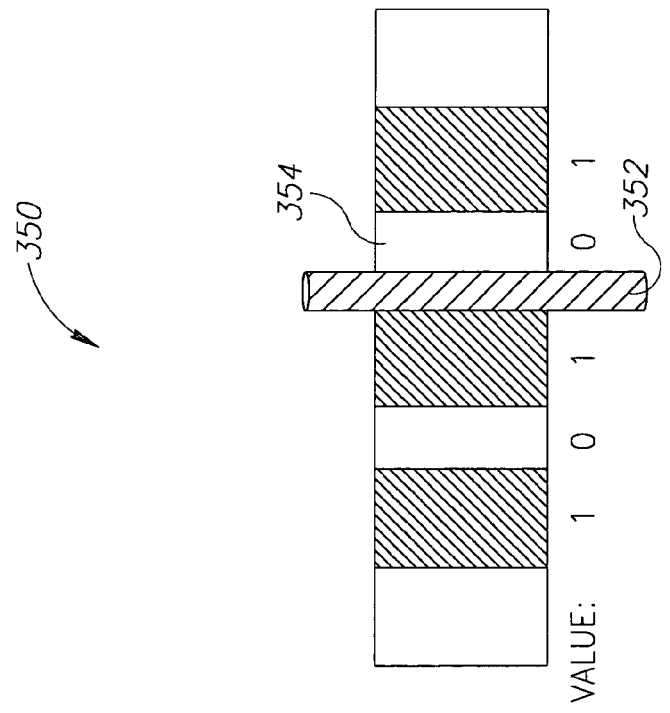
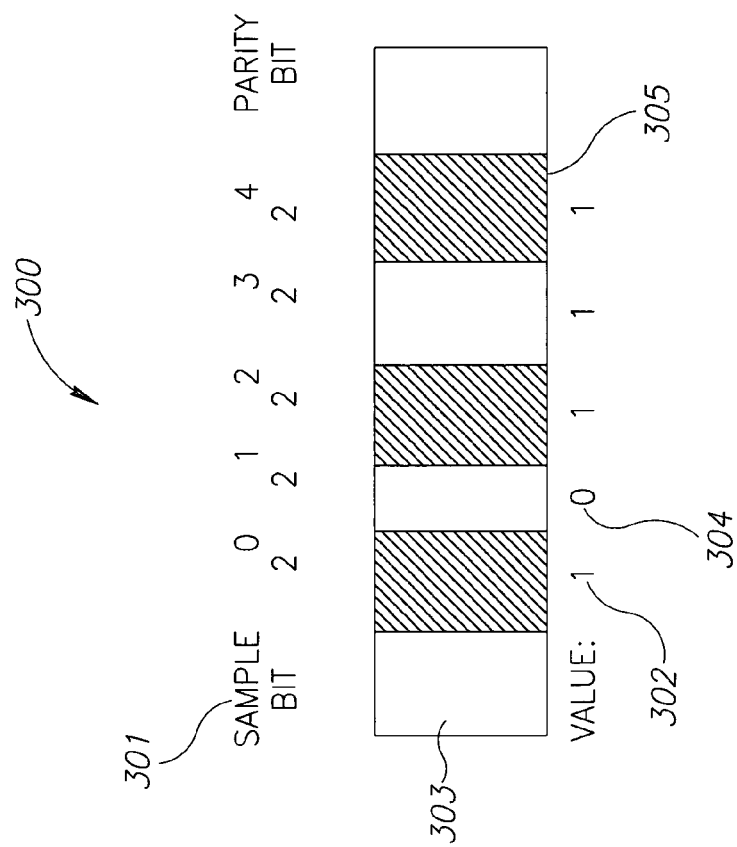
FIG. 3A
FIG. 3B

|  | $V_0$ |  | $V_1$ |  | $V_0 - V_1$ |  | $V_2$ |  | $V_0 - V_2$ |  |
|---|---|---|---|---|---|---|---|---|---|---|
|  | 158.20 | 245.40 | 159.59 | 241.21 | -1.39 | 4.19 | 159.09 | 240.6 | -0.89 | 4.8 |
|  | 157.70 | 489.30 | 158.79 | 485.03 | -1.09 | 4.27 | 158.23 | 483.77 | -0.53 | 5.53 |
|  | 523.80 | -311.70 | 526.70 | -312.64 | -2.90 | 0.94 | 525.37 | -311.65 | -1.57 | -0.05 |
|  | 523.80 | 192.00 | 526.14 | 192.66 | -2.34 | -0.66 | 524.67 | 192.29 | -0.87 | -0.29 |
|  | -78.20 | 457.60 | -77.8 | 459.16 | -0.34 | -1.56 | -77.785 | 457.91 | -0.41 | -0.30 |
|  | 523.80 | -2.40 | 525.73 | -2.48 | -1.93 | 0.08 | 524.32 | -2.3205 | -0.52 | -0.08 |
|  | -429.10 | -26.10 | -430.91 | -25.12 | 1.81 | -0.98 | -429.75 | -25.175 | 0.65 | -0.92 |
|  | 70.80 | -546.60 | 70.84 | -547.92 | -0.04 | 1.32 | 70.8 | -546.43 | 0.00 | -0.17 |
|  | -339.90 | -513.60 | -340.87 | -513.33 | 0.97 | -0.27 | -339.81 | -512.04 | -0.09 | -1.56 |
|  | -435.50 | 105.50 | -435.88 | 106.79 | 0.38 | -1.29 | -434.74 | 106.38 | -0.76 | -0.88 |
|  | 524.00 | 68.00 | 525.43 | 68.14 | -1.43 | -0.14 | 524 | 68.107 | 0.00 | -0.17 |
| MSE/DISTANCE SUM: | 3.539e-004 |  | 1.0575e-005 |  | 30.3 |  | 1.0575e-005 |  | 21 |  |

LOCALIZATION METHOD FOR MOBILE ROBOTS BASED ON LANDMARKS

CROSS-REFERENCE TO RELATED APPLICATIONS

This application is a National Phase Application of PCT International Application No. PCT/IL2008/000969, International filing date Jul. 13, 2008, entitled " LOCALIZATION METHOD FOR MOBILE ROBOTS BASED ON LANDMARKS", published on Jan. 15, 2009 as International Publication Number WO 2009/007983, which claims priority of U.S. Provisional Patent Application No. 60/929,782, entitled LOCALIZATION METHOD FOR MOBILE ROBOTS BASED ON LANDMARKS, filed on Jul. 12, 2007. Both of which are incorporated herein by reference in their entirety.

The present invention relates to navigation of mobile devices. More specifically, the present invention relates to a localization method for mobile robots based on landmarks.

BACKGROUND OF THE INVENTION

Mobile robots, including Automated Guided Vehicles (AGVS), are becoming more and more common in society. Mobile robots are widely used in industry, military and security environments. They also appear as consumer products, such as, but not limited to, for entertainment, as toy robots for instance, or to perform certain tasks like vacuum cleaning for instance.

Localization techniques refer to processes by which an Automated Guided Vehicles and mobile robots robot determines its position with respect to its surroundings in the workspace. This is an essential component for path planning to specific locations and for preventing the robot from reaching undesired locations.

While Global Positioning Systems (GPS) provide comfortable solutions for outdoor localization, other methods have to be considered for indoor localization.

One of the methods to perform indoor localization is to put landmarks at known locations and measure their bearings with respect to the robot during robot operation.

The traditional geometric method for localization from landmark bearings is based on the idea that two bearing measurements enforce the position of the robot to lie on a defined circle.

Thus, according to various investigators among them are M. Betke, and L. Gurvits "Mobile robot Localization using landmarks" in IEEE Trans. Robot. Automat., Vol. 13, number 2, pages 251-263, 1997, when three measurements are available the robot location can be computed.

The problem associated with this method is that it does not scale up for more than three measurements.

To overcome this problem, I. Shimshoni "On Mobile Robot Localization from Landmark Bearings" in IEEE Trans. Robotics and Automation volume 18 number 3, pages 971-976, 2002 suggested an efficient algebraic technique which allows estimating the error when more than three measurements are available.

Such algebraic technique deals correctly with unbiased noise and yields close to optimal results. However, in real world situations other sources of errors are present and must be handled by a localization method.

Thus, since mobile robot systems are widely used, an aim of the present invention is to disclose a localization method which enables handling a wide range of error sources reliably and efficiently.

Other advantages and aims of the present invention will become apparent after reading the present invention and reviewing the accompanying figures.

SUMMARY OF THE INVENTION

There is thus provided according to embodiments of the present invention, a method for estimating the location and orientation of a mobile robot with respect to landmarks whose positions are given, the robot is provided with a sensor for measuring bearings of the landmarks with respect to the robot where bias errors are present, the method comprising:

using the sensor to obtain bearings to the landmarks;

estimating the location and orientation of the robot with respect to the landmarks based on the measured bearings;

correcting bias errors associated with the measured bearings to obtain corrected bearings by finding a correction function that minimizes the sum of squared errors between measured bearings and the corrected bearings; and determining the location and the orientation of the robot to be where the sum of squared errors between measured bearings and the corrected bearings is minimal.

Furthermore, in accordance with some embodiments of the present invention, the correction function relates to parameters which include calculated angle of bearing $\beta c_i$, for each of the landmarks, denoted i, angle of obtained bearing $\beta_i$, for each of the landmarks, position of each of the landmark, $Pi_{x,y}$, position of the robot, $P_{x,y}$, and estimated orientation angle of the robot, $\theta$.

The correction function further comprising estimating an angular error value for each of the landmarks calculated to be $\Delta\beta i = (\beta c_i - \theta) - \beta i$ and calculating an error value associated with the determined location and the orientation of the robot to be:

$$S = \sum_{i=1}^{n} \frac{\Delta\beta_i^2}{n}$$

where n is the number of the landmarks.

Furthermore, in accordance with some embodiments of the present invention, the bias errors associated with the measured bearings comprise errors associated with a mechanical deficiency of the sensor.

Furthermore, in accordance with some embodiments of the present invention, the method used for correcting errors associated with a mechanical deficiency of the sensor comprises calculating a corrected angle of bearing to each of the landmarks, $\beta_{corr\,i}$.

Furthermore, in accordance with some embodiments of the present invention, calculating a corrected angle of bearing to each of the landmarks, $\beta_{corr\,i}$ comprising finding a correction function denoted $f$ that is defined to be continuous such that the corrected bearing $\beta_{corr\,i}$ for each of the landmarks is: $\beta_{corr\,i} = \beta_i + f(\beta_i)$ where $\beta_i$ is the angle of obtained bearing for each of the landmarks.

Furthermore, in accordance with some embodiments of the present invention, the given positions of the landmarks were inaccurately determined and the bias errors associated with the measured bearings comprise errors associated with the inaccurate determination of the positions of the landmarks.

Furthermore, in accordance with some embodiments of the present invention, correcting errors associated with inaccurate determination of the positions of the landmarks comprising:

using the sensor to obtain several bearing sets of at least three landmarks as the robot changes its position;

calculating optimal positions of the landmarks that minimize the sum of square error values over the bearing sets, and using a similarity transformation for transforming the optimal positions of the landmarks to determine positions of the landmarks that are closest to the given positions of the landmarks.

Furthermore, in accordance with some embodiments of the present invention, the bias errors associated with the measured bearings comprise errors associated with a mechanical deficiency of the sensor, also comprise errors associated with inaccurate determination of the positions of the landmarks.

Furthermore, in accordance with some embodiments of the present invention, the bias errors associated with the measured bearings comprise errors attributed to rotations of the robot.

Furthermore, in accordance with some embodiments of the present invention, the correction function is used to estimate a rotation speed of the robot that minimizes error values attributed to the rotations of the robot.

Furthermore, in accordance with some embodiments of the present invention, the bias errors associated with the measured bearings comprise errors attributed to misidentification of the landmarks.

Furthermore, in accordance with some embodiments of the present invention, determining existence of misidentified landmarks comprising:

checking if the sum of the squared errors between measured bearings and the corrected bearings is above a predetermined threshold;

for a randomly chosen subset of the landmarks determining the location and the orientation of the robot to be where the sum of squared errors between measured bearings and the corrected bearings is minimal;

calculating for the landmarks that were not included in the subset the errors between measured bearings and the corrected bearings;

if for most of the landmarks the errors are below a predetermined value, identifying and disregarding landmarks where the errors were above the predetermined value as the misidentified landmarks; and if for most of the landmarks the errors are over a predetermined value, randomly choosing a new subset of the landmarks and repeating the steps of determining the location and the orientation of the robot to be where the sum of squared errors between measured bearings and the corrected bearings is minimal;

calculating for the landmarks that were not included in the new subset the errors between measured bearings and the corrected bearings, until the errors for most of the landmarks are below the predetermined value.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3A illustrates an example of a landmark.

FIG. 3B illustrates an example of a misidentified landmark.

FIG. 6 illustrates a table providing landmark coordinate vectors and the sum of the associated error values.

Figure 1:
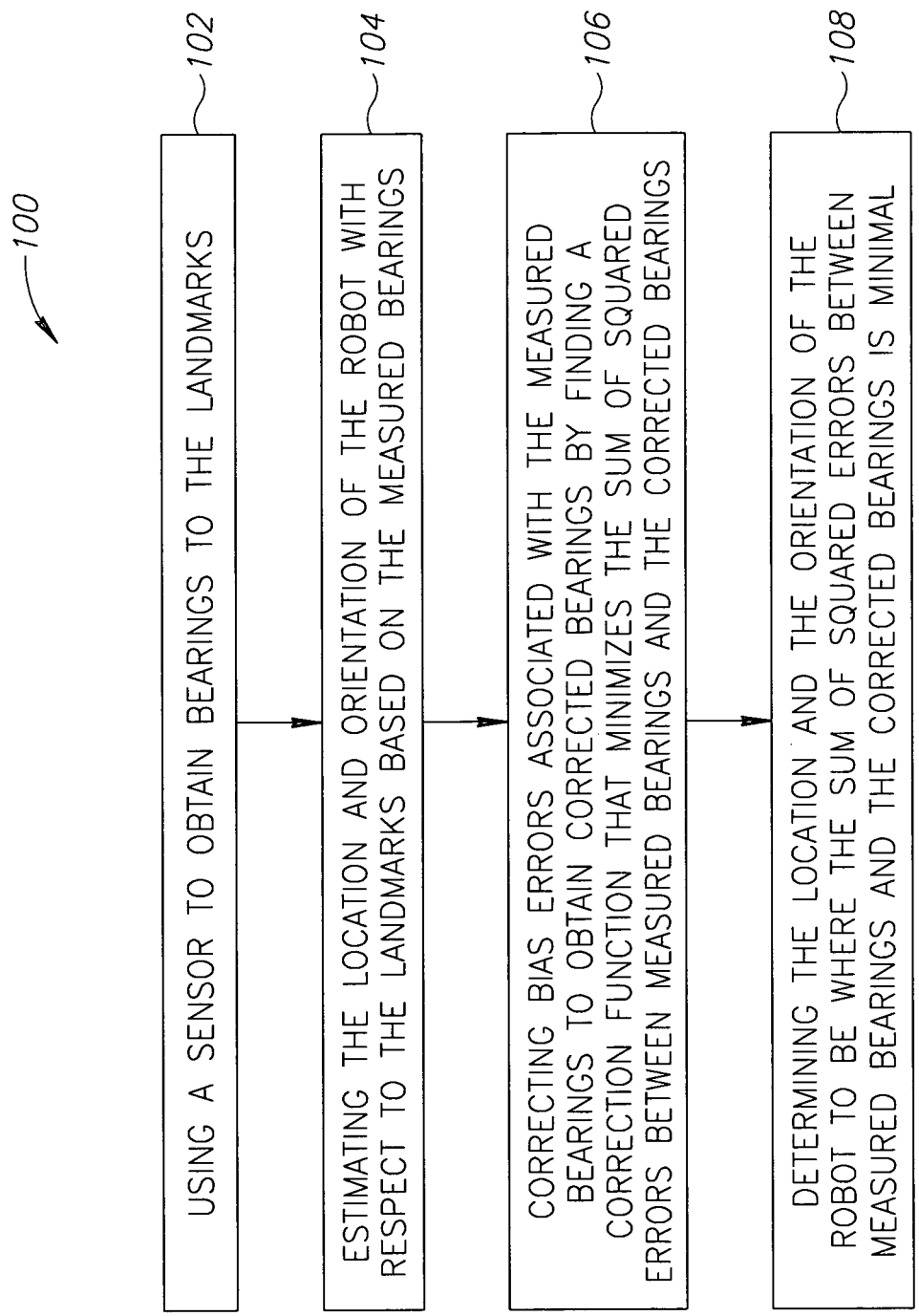
FIG. 1 is a flow chart illustrating stages of a localization method in accordance with embodiments of the present invention

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Localization is required in order to enable a mobile robot to know its location in the workplace. This is an essential component for path planning to specific locations and for preventing the robot from reaching undesired locations.

Therefore, a localization method that is used for estimating the position and orientation of a mobile robot is disclosed in the present invention.

The localization method, in accordance with embodiments of the present invention, allows estimating the position and orientation of a mobile robot with respect to landmarks whose positions are given. The robot is provided with a sensor for measuring bearings of the landmarks with respect to the robot, where bias errors are present.

The localization method, in accordance with embodiments of the present invention, is a mathematical method which overcomes four sources of failures: (a) Biased bearing measurement errors occurred due to mechanical deficiency of the sensor and its mounting on the robot, (b) Inaccurate manual measurements of the positions of the landmarks fed into the algorithm, (c) Distorted measurements during robot rotations, and (d) Misidentification of landmarks.

FIG. 1 is a flow chart 100 illustrating stages of a localization method in accordance with embodiments of the present invention. The localization method according to embodiments of the present invention comprises: using a sensor to obtain bearings to the landmarks 102, estimating the location and orientation of the robot with respect to the landmarks based on the measured bearings 104, correcting bias errors associated with the measured bearings to obtain corrected bearings by finding a correction function that minimizes the sum of squared errors between measured bearings and the corrected bearings 106, and determining the location and the orientation of the robot to be where the sum of squared errors between measured bearings and the corrected bearings is minimal 108.

Figure 2:
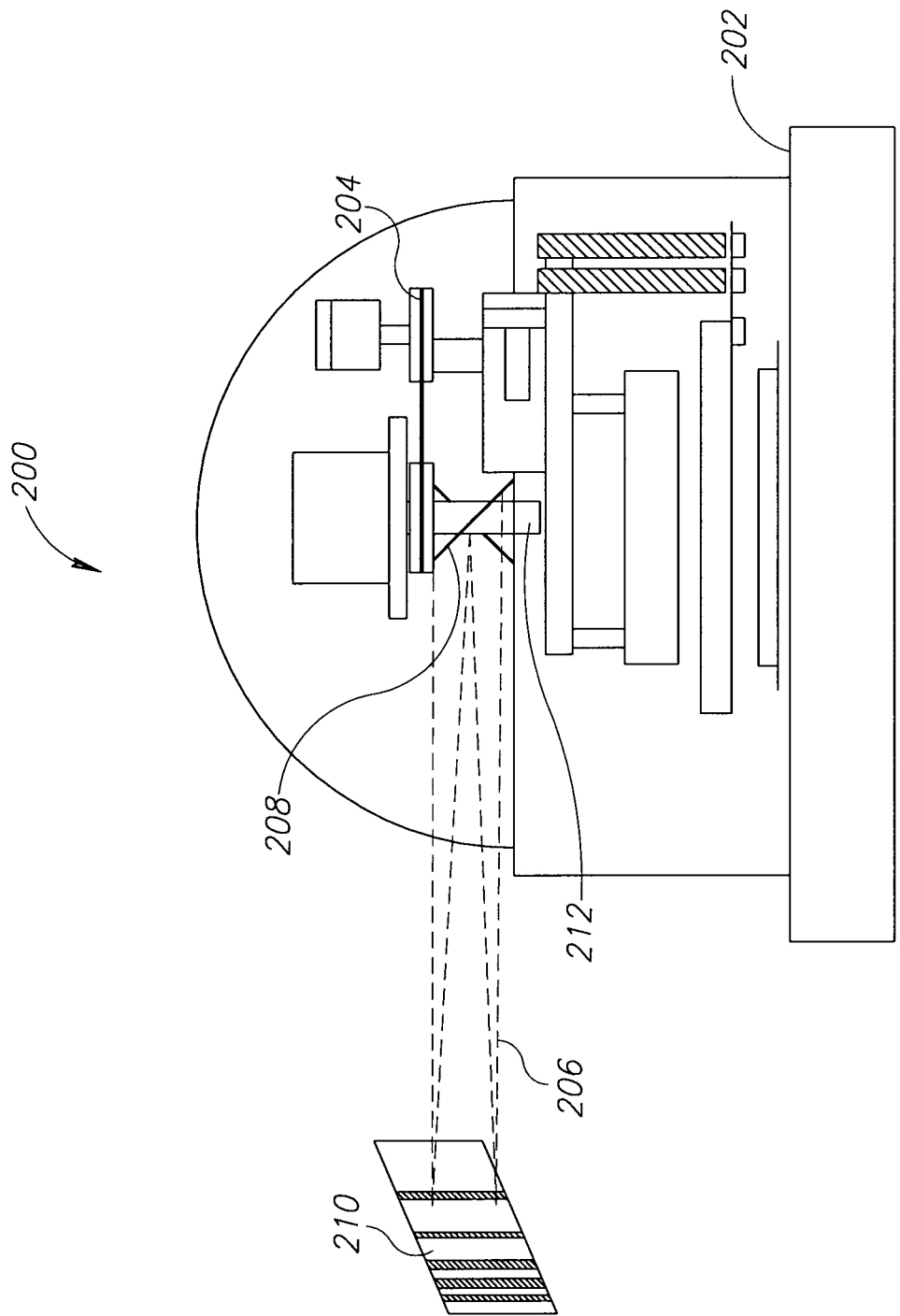
FIG. 2 is a schematic illustration of a laserNav sensor manufactured by Denning Mobile Robotics, Inc.

FIG. 2 is a schematic illustration of a laserNav sensor 200 (manufactured by Denning Mobile Robotics, Inc.) which is a precision optical positioning sensor that can be used on a moving platform 202 such as automated guided vehicle systems (AGVS) and mobile robots to give exact position and orientation information supporting autonomous navigation, guidance and path following.

It should be noted that similar sensors of other manufacturers may be used as well.

As seen in FIG. 2, LaserNav sensor 200 uses an eye safe scanning laser 204 to produce beam 206. Beam 206 passes through a path directing mirror 208 and is used for detecting landmarks such as landmark 210.

These landmarks can be made from a retroreflective material such as, but not limited to, a material named 2000X manufactured by 3M, U.S.A, so they reflect and return laser beam 206 to a scanner, unlike other objects, that scatter the beam.

Thus, LaserNav sensor 200 senses such landmarks and sends them to a computer.

LaserNav sensor 200 has a full 360 degree field of view except for two 4 degree blind spots caused by support posts such as support post 212.

FIG. 3A illustrates an example of a landmark 300.

Landmark 300 consists of alternate strips of retro-reflective material and diffuse reflecting material. Landmark index 301 is coded with 5 data bits, "one" bit 302 and "zero" bit 304 which have a different length.

Indexing landmark 300 gives:

$$1*2^0+0*2^1+1*2^2+1*2^3+1*2^4=29$$

It may happen that due to partial occlusion of the landmark or insufficient lighting conditions, a landmark index may include errors.

FIG. 3B illustrates an example of a misidentified landmark 350.

Concealing element 352 causes misidentification of bit 354. The index of the misidentified landmark is:

$$1*2^0+0*2^1+1*2^2+0*2^3+1*2^4=21$$

To derive a relation between the position of a landmark and the position and orientation of a robot, the inventors perform a coordinate transformation from the room coordinate system to the robot coordinate system.

The inventors consider a set of n landmarks whose positions are $P_i \in R^2$, wherein the robot position P and orientation $\theta$ are unknown. Then, the transformation of a single bearing yields the following:

$$Mi = li(\cos \beta i, \sin \beta i) = R(Pi - P) = RPi + T \quad (1)$$

where Mi are the coordinates of the bearing in the robot coordinate system, R is a planar rotation matrix by $\theta$, $\beta_i$ is the measured angle of the bearing to the landmark, li is the unknown distance from P to Pi and T=−RP.

This formulation leads to a linear homogeneous equation with four unknowns. When three measurements are available together with an additional structural constraint, the problem can be solved and the position and the orientation of the robot may be computed.

If more than three landmarks are available, the least squares solution is obtained, and the sum of square errors provide a quality measure.

Estimation of the accuracy is done by finding the difference between the measured angles of the bearings and the angles calculated based on the given positions of the landmarks wherein given positions of the landmarks refer to initially measured landmark positions either manually or by any other way.

Thus, if $(P_x, P_y)$ is the position of the robot which is obtained by the localization method, and $(P_{ix}, P_{iy})$ is the position of landmark i, estimating the angle of the bearing is therefore:

$$\beta_{ci} = \arctan 2(\Delta xi, \Delta yi) \quad (2)$$

where $\Delta x_i = Pi_x - Px$, $\Delta y_i = Pi_y - Py$

The angular error of a single landmark is:

$$\Delta \beta i = (\beta c_i - \theta) - \beta i \quad (3)$$

wherein $\beta c_i$ is the calculated angle of the bearing, $\beta i$ is the measured angle of the bearing, and $\theta$ is the orientation angle of the robot.

The error value associated with the results obtained by the localization method is the average of the sum of square errors of all the landmarks of the scanned set (hereinafter referred to as "subset").

$$S = \sum_{i=1}^{n} \frac{\Delta \beta_i^2}{n} \quad (4)$$

When S is greater than some threshold, the measurement is considered wrong.

The mathematical method described above for estimating, the error value associated with measures obtained by the localization method is a basic method used for handling various problems such as those mentioned earlier i.e., biased bearing measurement errors due to mechanical deficiency of the LaserNav sensor, inaccurate given positions of the landmarks, distorted measurements during robot rotations and misidentification of landmarks.

Figure 4:
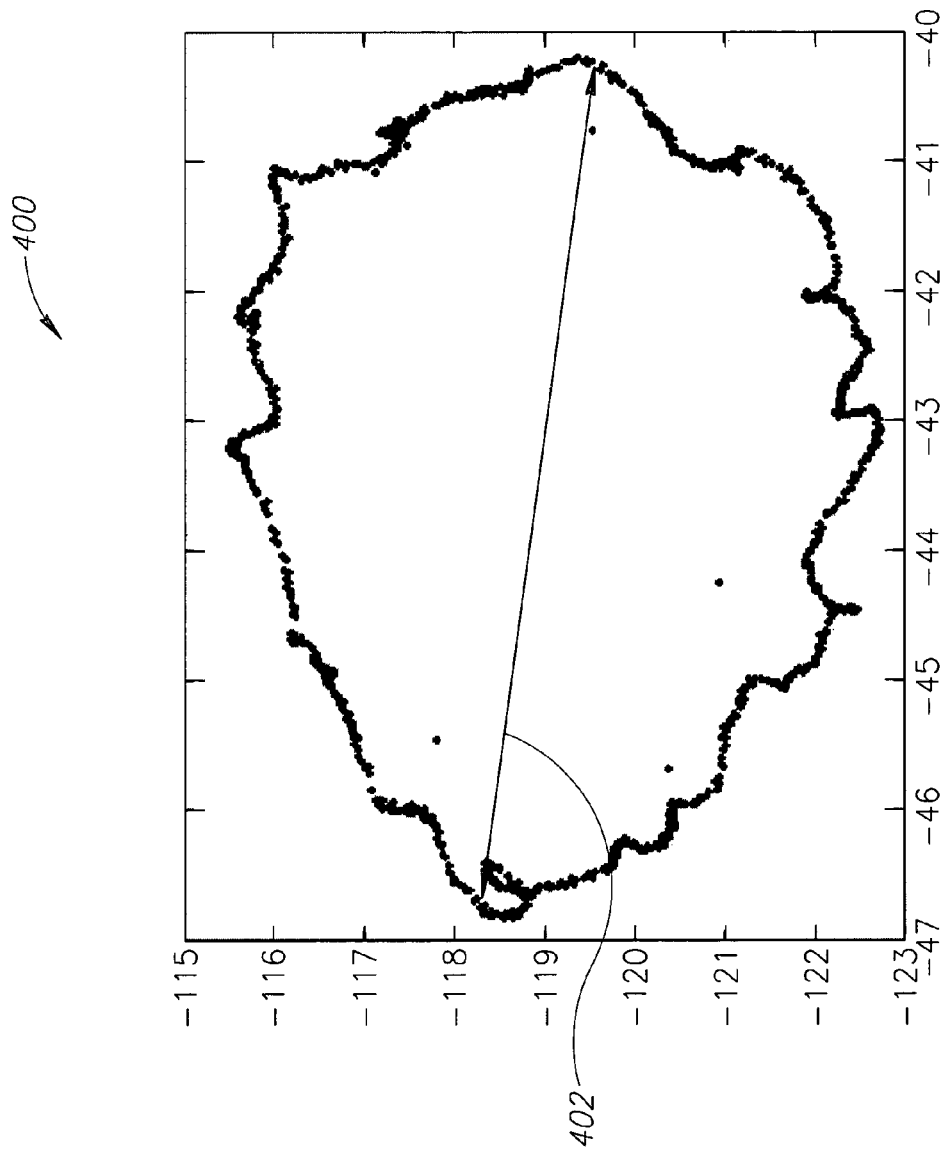
FIG. 4 schematically illustrates distorted results obtained by the localization method.

FIG. 4 schematically illustrates distorted measures 400 of the robot position.

The position $(P_x, P_y)$ of the robot which was calculated by the localization method was supposed to be close to constant, but due to the mechanical deficiency of the LaserNav sensor and the robot, the results were grossly distorted and dispersed over a diameter of about 7 cm 402 as can be seen in FIG. 4.

To overcome biased bearing measurement errors attributed to mechanical deficiency of the sensor, the inventors aim at finding a bias correction function $f$ for each landmark bearing $\beta i$ such that:

$$\beta_{corr_i} = \beta_i + f(\beta_i)$$

where $\beta_{corr_i}$ is the corrected angle.

The average value of $f$ must be zero since otherwise the correcting function contributes a constant rotation component to the robot.

In addition, due to the nature of the distortion, $f$ is continuous and periodic, and thus is best represent by its Fourier coefficients.

The inventors make a second-degree approximation of the function and get $$f(\beta i) = A\cos(\beta_i) + B\sin(\beta_i) + C\cos(2\beta_i) + D\sin(2\beta_i) + K. \quad (5)$$

In order to find the coefficients A, B, C, and D, the inventors use a minimization technique that minimizes the sum of error values over the measurement set where K, the average value of the function, is zero. Thus, $$\{A, B, C, D\} = \operatorname{argmin} \sum_{j=1}^{M} S_j \quad (6)$$

where M is the number of the scanned subsets in the set, and Sj is the error value associated with the localization result of subset j.

The estimated angular error is determined as:

$$\Delta\beta_i = \beta_{ei} - \theta - (\beta_i + f(\beta_i))$$

Figure 5:
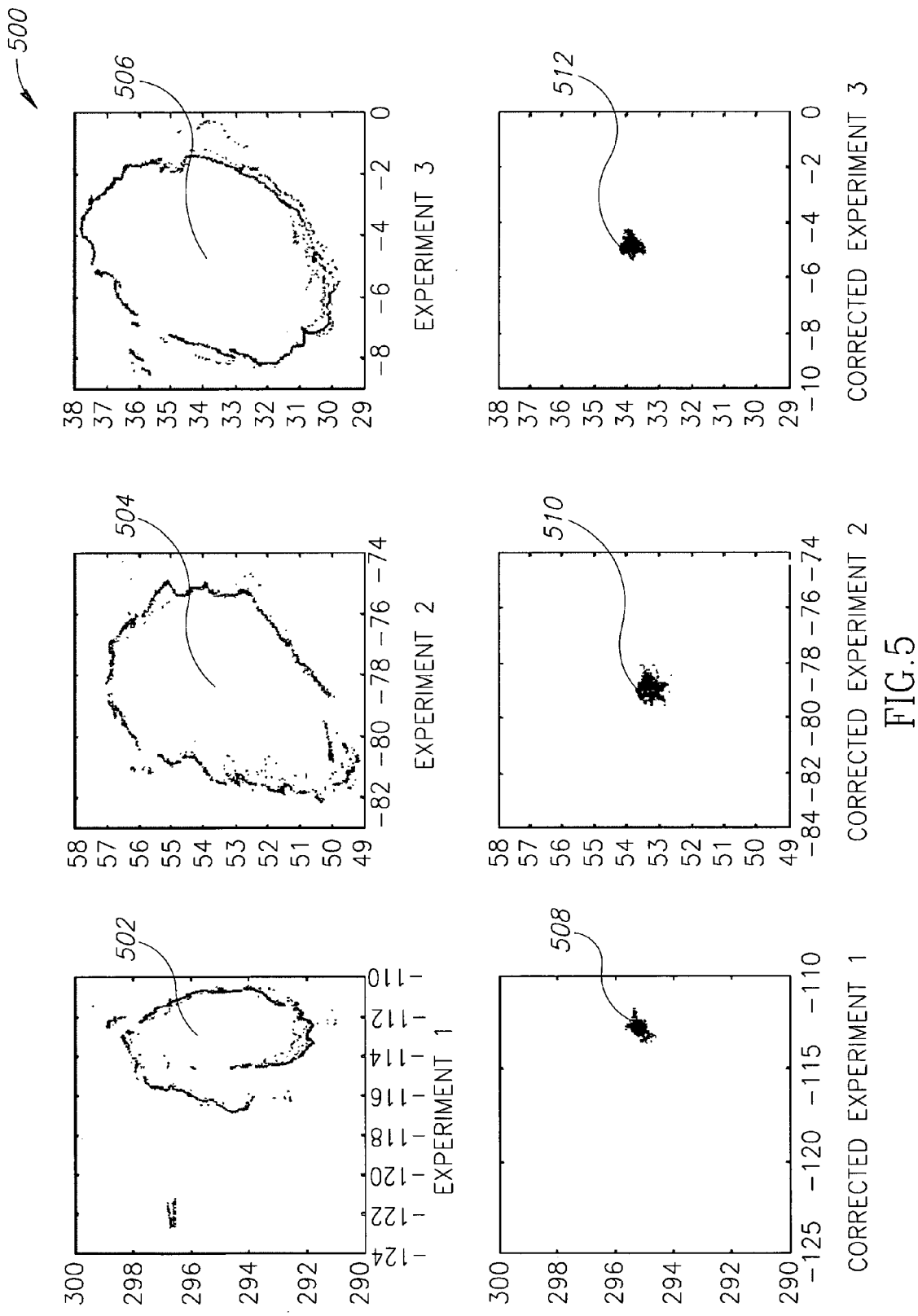
FIG. 5 schematically illustrates 3 distorted experimental results and the accompanied corrected profiles obtained by the localization method.

FIG. 5 schematically illustrates 3 distorted experimental results and the accompanied corrected profiles which were obtained by the localization method.

The distortions in this case are due to mechanical deficiencies at three different (x,y) positions of the robot.

As noted earlier, the inventors use a minimization technique to derive equation (6) for correcting the distorted profiles shown in FIG. 5. They use the same correction parameters (i.e., ABCD=[−0.0080927 0.0004992 0.00098311 −4.1253e-005]) and transform twisted circles 502, 504, and 506 into circles 508, 510, and 512 each having an approximate diameter of 1.5 cm while 95% of the points lie within a 1 cm diameter.

Another problem handled by the localization method in accordance with embodiments of the present invention is associated with inaccurate given positions of landmarks.

It should be noted that the given positions of the landmarks may be manually measured or otherwise.

Inaccurate given positions of landmarks can distort the localization results. Furthermore, the degree of distortion may increase if the inaccuracies are associated with measurements that depend on one another (i.e., if the position of a landmark is measured relative to another landmark in the group).

It should be noted that errors attributed to inaccurate given positions of the landmarks may be sometimes of the same order of magnitude as the error associated with landmark index misidentification.

As will be discussed later in the text, errors associated with landmark index misidentification cause the elimination of those landmarks from a measurement (i.e., from a subset) and an undesired removal of an entire subset.

Thus, errors attributed to inaccurate given positions which are of the same order of magnitude as errors associated with landmark index misidentification may cause the elimination of landmarks from the measurement and an undesired removal of an entire subset.

To avoid the above-mentioned scenario, it is required to reduce the amplitude of errors associated with inaccurate given positions of the landmarks and force them to be normally distributed (i.e., to have a Gaussian distribution).

This is done by a two-step algorithm. In the first step, the optimal positions of the landmarks are calculated minimizing the sum of the error values (eq. 4) over the scanned subsets. The resulting positions, however, are invariant to planar similarity transformations. Therefore, the second step involves with finding a similarity transformation for transforming the resulting positions to yield positions which are closest to the initial given positions of the landmarks.

Thus, the obtained positions coincide as much as possible with the given positions of the bearings.

A detailed description of the two-step algorithm disclosed above is provided in the following example:

The inventors use n=11 landmarks and take M=50 measurements (i.e., scanned subsets).

For each scanned subset the robot position is estimated and its error value is computed.

When the landmark positions change, so do the computed robot positions and the error values of the scanned subset.

The inventors aim at finding the landmark positions vector denoted as $V_1$ that minimizes the sum of error values over the set of M scanned subsets, and thus, use an optimization program with starting point $V_0$.

The inventors assume that the given positions of the landmarks are inaccurate but represent the landmark positions in the room coordinate system.

They also assume that the optimization program distort the (original) given position of the landmarks.

Therefore, they aim at finding a similarity transformation consisting of a rotation matrix R, a translation vector t and a scale parameter s. Applying the similarity transformation to $V_1$ yields $V_2$ whose distance from the given landmark positions vector $V_0$ is minimal.

To solve this problem, the inventors formulate a new minimization problem, where the target function is:

$$\{s,\gamma,t\} = \arg\min \|V_2 - V_1\| \quad (7)$$

Subject to:

$$V_{2_i} = s \cdot R \cdot V_{1_i} + t$$

where R is a planar rotation matrix by $\gamma$ and $V_{2i}$ are the coordinates of landmark i in the vector $V_2$.

The search for minimum starts from s=1, $\gamma$=0, t=(0,0) since for those values, $V_{2i}=V_{1i}$.

FIG. 6 illustrates a table 600 providing landmark coordinate vectors and the sum of the associated error values.

As seen, in the first two rows of table 600, the V0-V1 values are very large and similar. This is due to an inaccurate given position of a first landmark based on which the position of a second landmark was measured.

As seen, the sum of squared errors for V2 is the same as for V1, and the total distance to V0 was reduced from 30.3 cm to 21 cm as a result of the minimization process.

Another problem that the inventors handle by using the disclosed localization method in accordance with embodiments of the present invention is associated with distortions added to the LaserNav sensor measurements during robot rotations.

According to their experimental results, the inventors found that the distortion added to the LaserNav sensor measurements while the robot rotates depends the rotation speed of the robot. Therefore, they aim at finding an optimized rotation speed of the robot that minimizes the error value associated with the motion of the robot for all measurements. More specifically, the inventors aim at finding a rotation speed which minimizes the vectorial angle added to the angular measurement of a landmark bearing with respect to the robot position.

Figure 7:
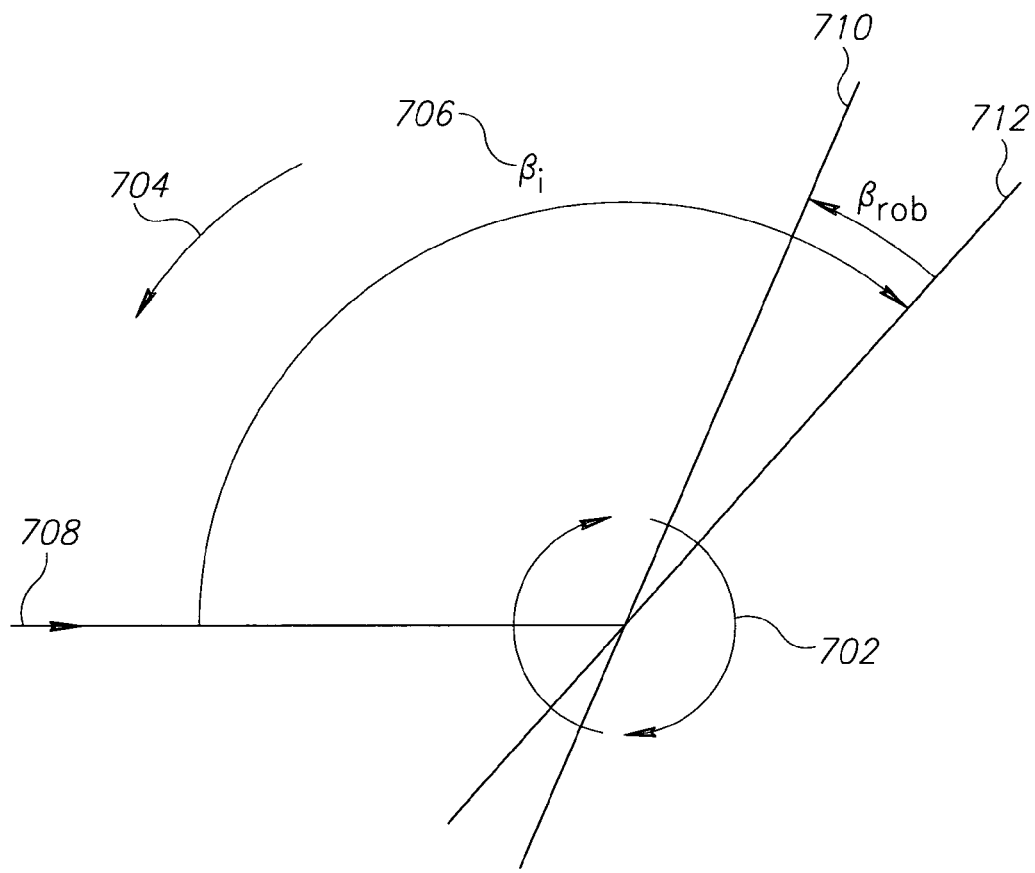
FIG. 7 is a schematic illustration of a distorted angle measurement due to robot rotation.

FIG. 7 is a schematic illustration of a distorted angle measurement due to robot rotation.

The inventors propose a model according which a mirror (mirror 208 shown in FIG. 2) rotates 702 clockwise at a speed $v_{mirr}$=10 RPS, and the robot rotates 704 counterclockwise at a speed of $v_r$.

Suppose that a landmark bearing $\beta i$ 706 is observed, the scan starts at point 708 at time $t_0$ and the landmark is detected at time $t_i$.

Then $\Delta t_i = t i - t_0 = \beta i / v_{mirr}$. At this time the mirror has rotated $\beta_{mirr_i} = v_{mirr} \cdot \Delta t_i$ and the robot rotated $\beta_{robi} = v_{rob} \cdot \Delta t_i$ causing a distorted bearing 710 to be observed (bearing 712 is the true bearing which is supposed to be observed when the distortion attributed to the rotation of the robot is overcomed).

Both angles i.e., the angle due to the rotation of the robot, $\beta$robi, and the angle due to the rotation of the mirror, $\beta$mirri donate to the measured bearing:

$$\beta i = \beta \text{rob} i + \beta \text{mirr} i.$$

The inventors are interested in isolating the mirror rotation, and thus subtract $\beta_{rob}$;

$$\beta \text{mirr} i = \beta i - \beta \text{rob} i.$$

To find a velocity of the robot that minimizes the error value of the result for all the observed landmarks, the inventors define the error of a single landmark as:

$$\Delta \beta_i = (\beta_{c_i} - \theta) - \beta_{mirr_i}$$

and solve the following minimization problem:

$$v_{rob} = \operatorname{argmin} \sum_{i=1}^{n} \frac{\Delta \beta_i^2}{n} \tag{8}$$

Subject to $$\Delta \beta_i = (\beta_{ci} - \theta) - \beta_i \left(1 - \frac{v_{rob}}{v_{mirr}}\right)$$

Figure 8:
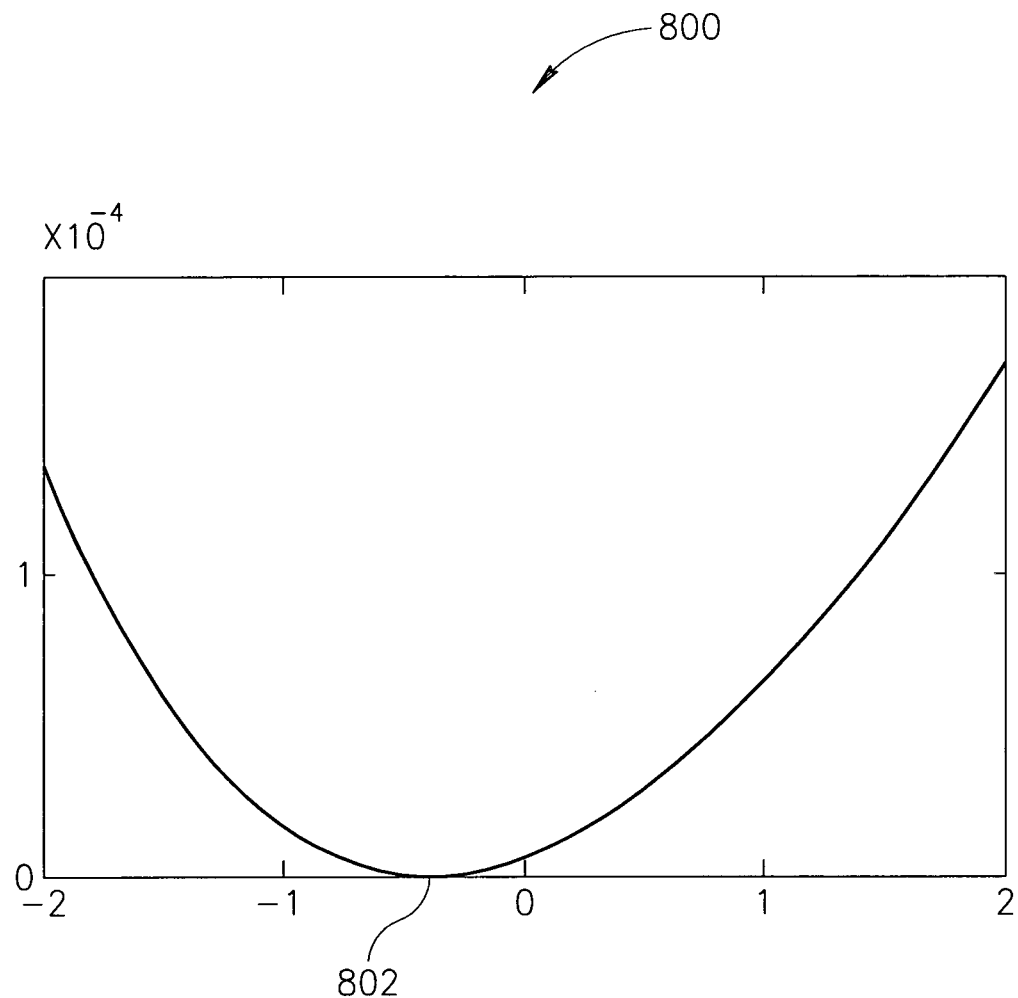
FIG. 8 is a plot of the error value of a scan vs. the assumed robot speed.

FIG. 8 is a plot 800 of the error value of a scanned subset vs. the assumed robot angular velocity.

The curve produced by the error function vs. the approximated angular velocity of the robot possesses a shape close to the shape of a parabola wherein minimum point 802 corresponds to the correct speed of the robot, i.e., to the speed which minimizes the error associated with the rotation of the robot.

Figure 9B:
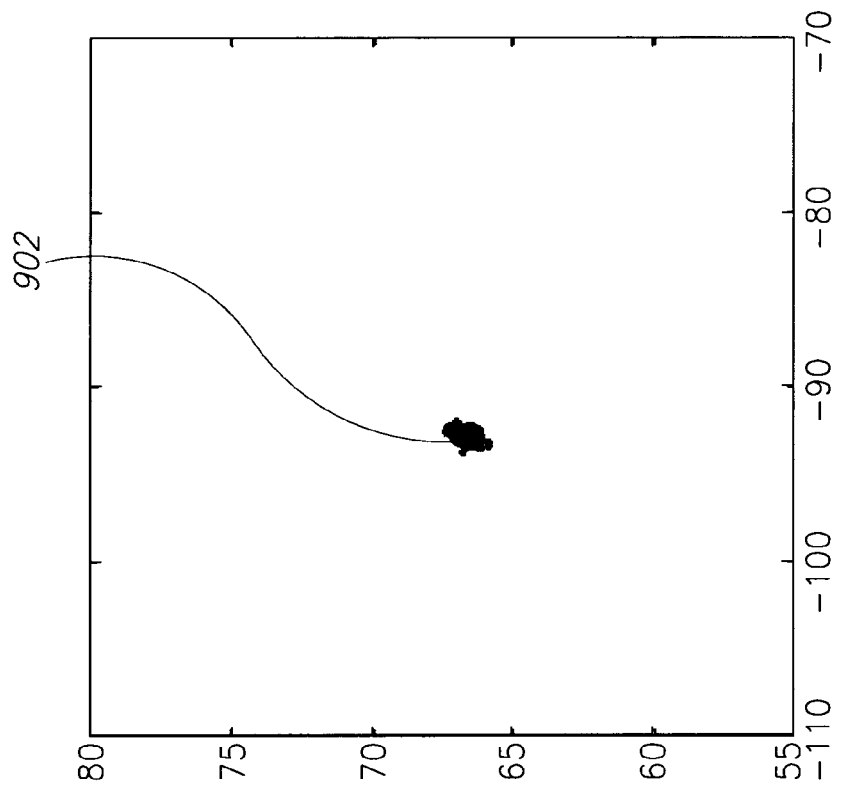
FIG. 9B illustrates a corrected profile of localization results obtained during robot rotation.
Figure 9A:
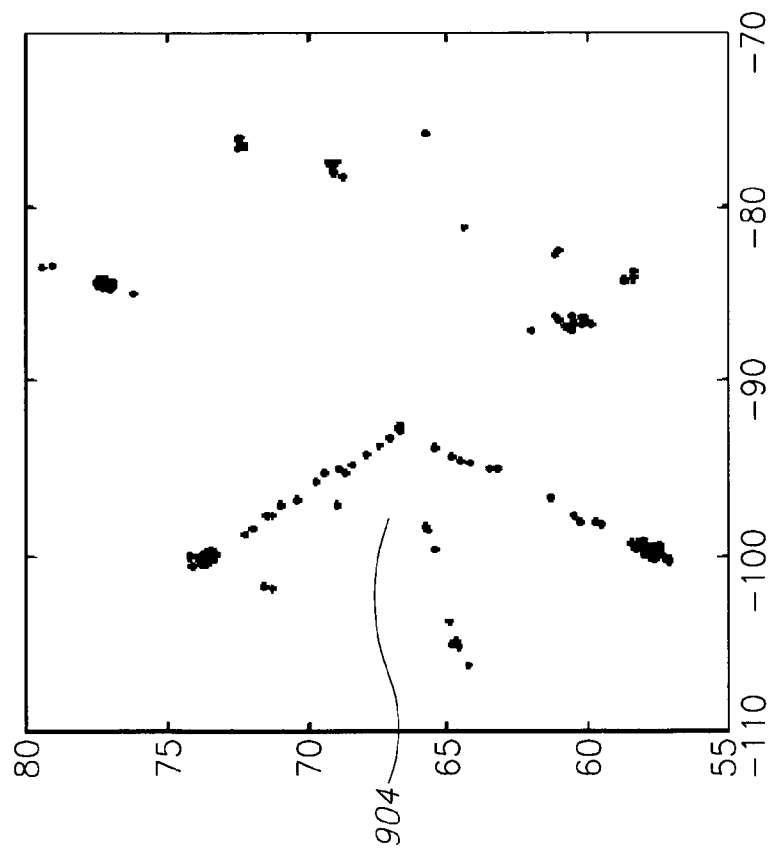
FIG. 9A illustrates distorted localization results obtained during robot rotation.

FIGS. 9A&B illustrate the localization results during robot rotation.

FIG. 9A illustrates distorted localization results obtained during robot rotation.

FIG. 9B illustrates a corrected profile of localization results obtained during robot rotation.

In this experiment the robot was rotating at speeds up to 45°/second around its axis at a fixed position. 170 scans were taken during the experiment and for each scan the angular velocity was estimated independently.

The corrected results lie within a circle 902 with a diameter of 2 cm, while the raw results are scattered within a circle 904 with a diameter of 30 cm.

The sum of the error values over the set of scans is 2.80E-05 for the corrected results as compared to 1.68E-02 for the raw results.

These results clearly show that the localization method proposed by the inventors for correcting the localization during robot rotation is essential and highly efficient in minimizing the error associated with angular measurements while the robot rotates.

Another problem handled by using the disclosed localization method in accordance with embodiments of the present invention is associated with sensor misidentification of landmarks.

As noted earlier, partial concealment of landmarks is the main cause of misidentification of landmarks. When an object conceals a part of a reflective bit on the landmark, the sensor can read the value of such bit as "0" instead of "1".

An example of such case is shown in FIG. 3B. The meaning of such an error for the localization system is that it may detect some landmarks at angles which are completely incorrect.

Figure 10:
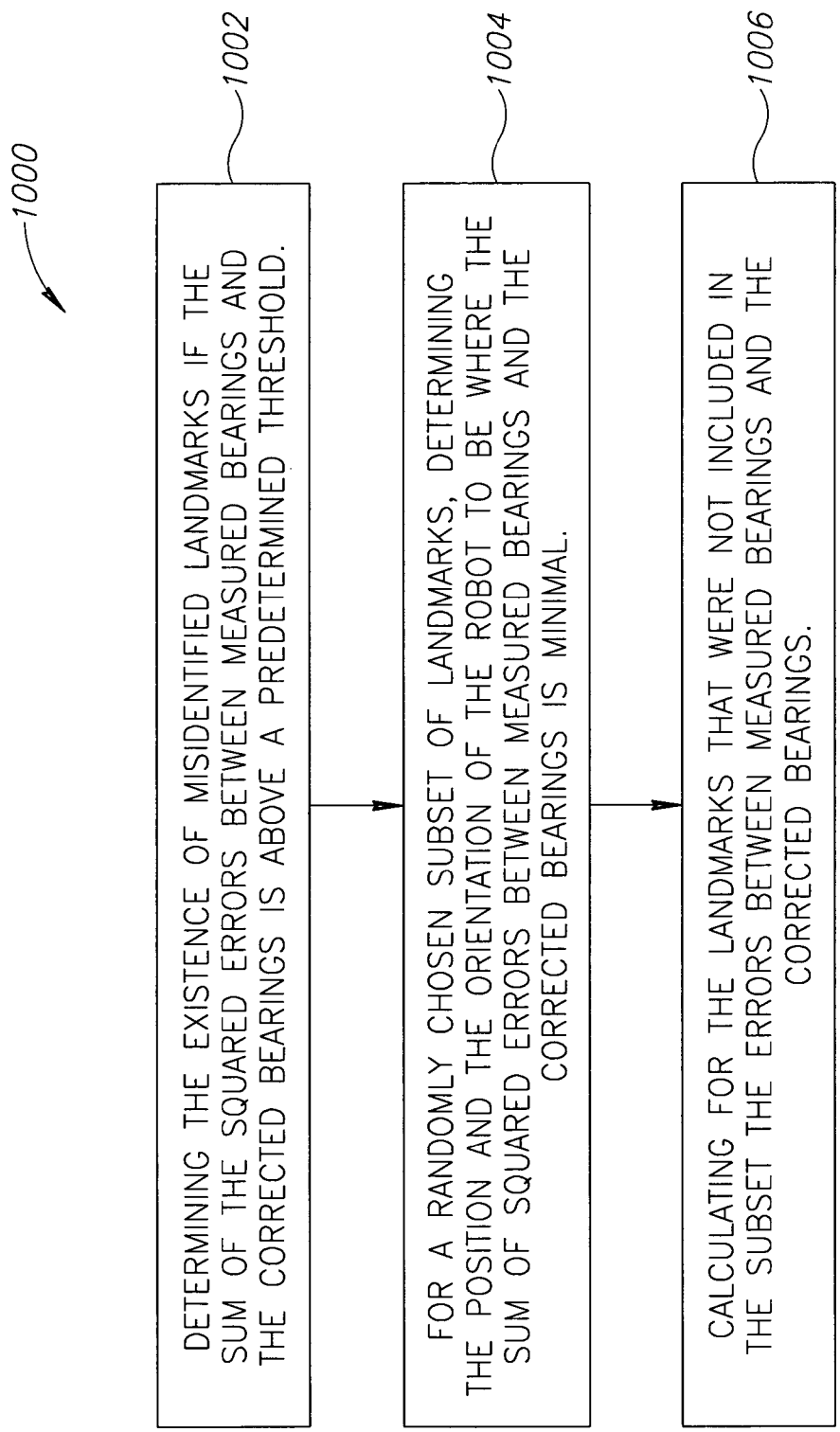
FIG. 10 is a flow chart illustrating stages of a method to be used in order to overcome the problem of index misidentification in accordance with embodiments of the present invention.
Figure 10:
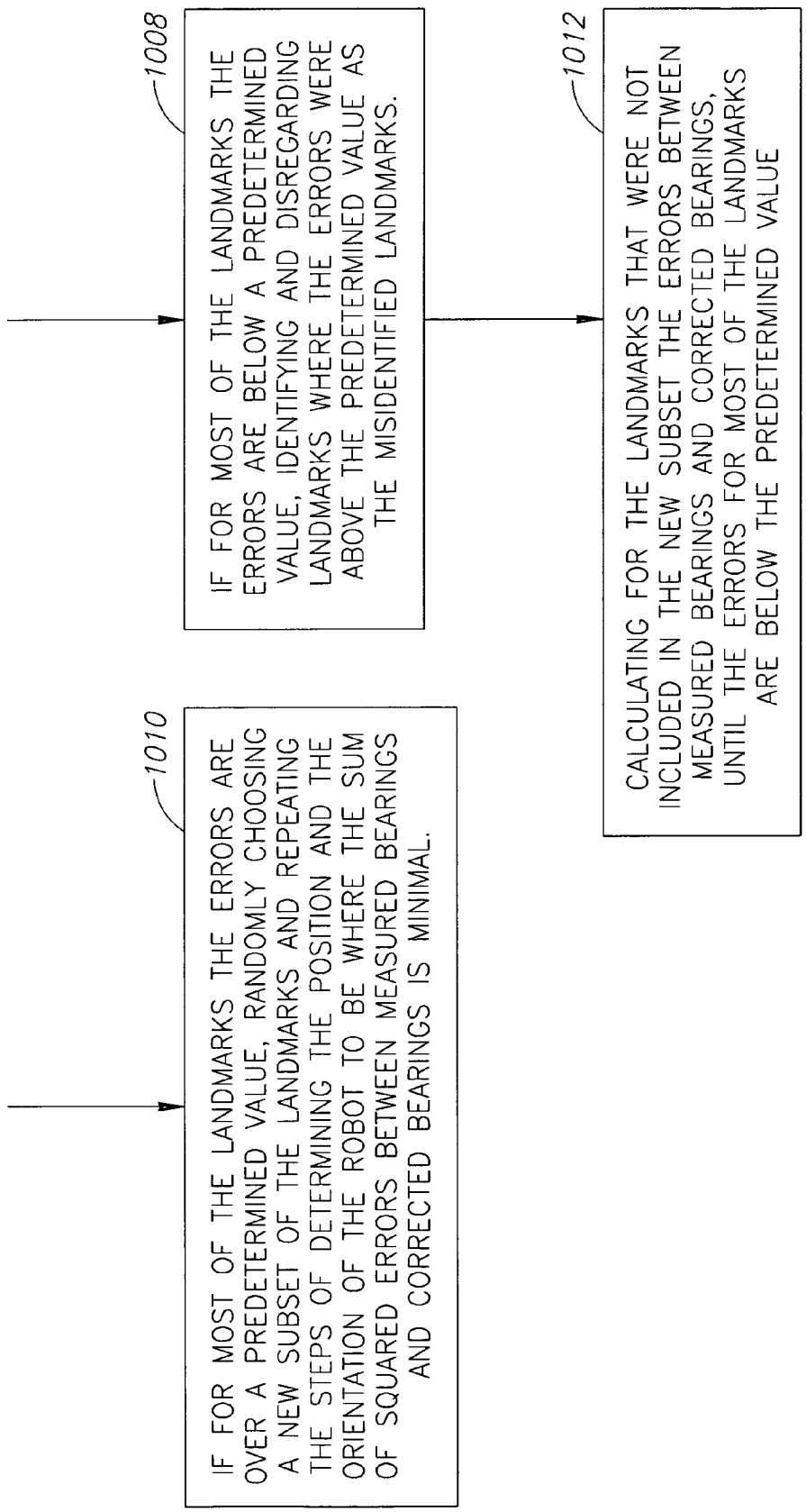

FIG. 10 is a flow chart 1000 illustrating stages of a method to be used in order to overcome the problem of index misidentification. The method according to embodiments of the present invention comprises: determining the existence of misidentified landmarks if the sum of the squared errors between measured bearings and the calculated bearings is above a predetermined threshold 1002, for a randomly chosen subset of landmarks, determining the position and the orientation of the robot to be where the sum of squared errors between measured bearings and the calculated bearings is minimal 1004, calculating for the landmarks that were not included in the subset the errors between measured bearings and the calculated bearings 1006, if for most of the landmarks the errors are below a predetermined value, identifying and disregarding landmarks where the errors were above the predetermined value as the misidentified landmarks 1008, and if for most of the landmarks the errors are over a predetermined value, randomly choosing a new subset of the landmarks and repeating the steps of determining the position and the orientation of the robot to be where the sum of squared errors between measured bearings and the calculated bearings is minimal 1010, calculating for the landmarks that were not included in the new subset the errors between measured bearings and the calculated bearings, until the errors for most of the landmarks are below the predetermined value 1012.

The inventors disclose two methods that can be used for eliminating the misidentified landmarks. These methods are illustrated in FIGS. 11 and 12.

Figure 11:
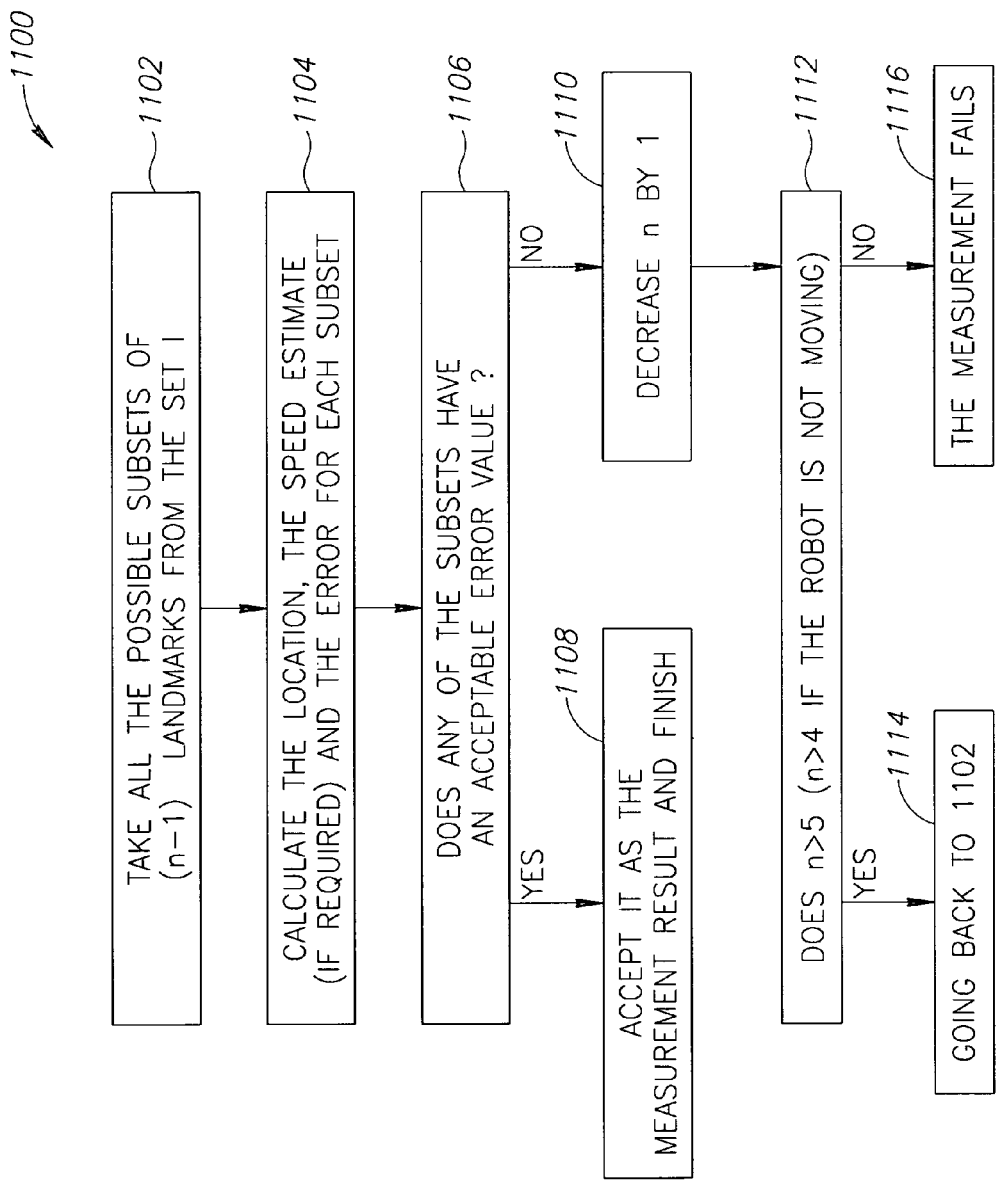
FIG. 11 is a flow chart illustrating stages of a method based on "The Complete Approach" for eliminating misidentified landmarks in accordance with embodiments of the present invention.

FIG. 11 is a flow chart 1100 illustrating stages of a method based on "The Complete Approach" for eliminating misidentified landmarks in accordance with embodiments of the present invention. A method according to embodiments of the present invention comprises: taking all the possible subsets of (n−1) landmarks from the set I 1102, calculating the position and estimating the speed (if required), and the error for each subset 1104, checking whether any of the subsets have an acceptable error value 1106, if any of the subsets has an acceptable error value, accepting it as the measurement result and completing the process 1108, if no set has an acceptable error value, decreasing n by 1 1110, if n>5 (n>4 if the robot is not moving) 1112, going back 1114 to 1102, else, the measurement fails 1116.

Another method for eliminating misidentified landmarks is based on the "RANSAC" approach. In this method, the inventors treat the problem as a set of measurements that contain a majority of true measurements and some wrong measurements and formulate an algorithm based on a technique designed to solve such a scenario that was developed by M. A. Fischler and R. C. Bolles "Random Sample Consensus: A Paradigm for Model Fitting with Applications to Image Analysis and Automated Cartography" in Communications of the ACM Vol. 24, number 6, pages 381-395, June 1981.

Figure 12:
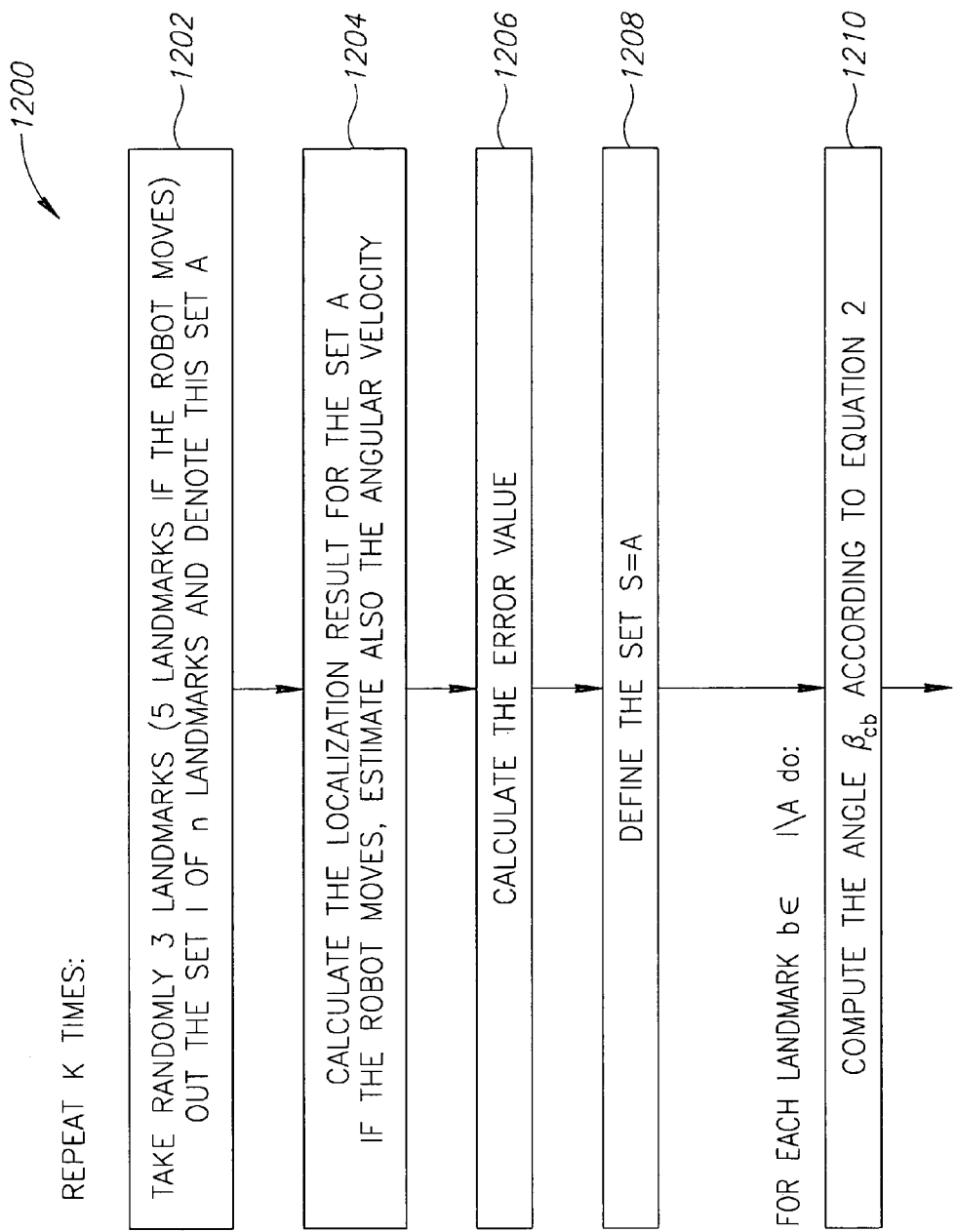
FIG. 12 is a flow chart illustrating stages of a method for eliminating misidentified landmarks based on the "RANSAC" approach.
Figure 12:
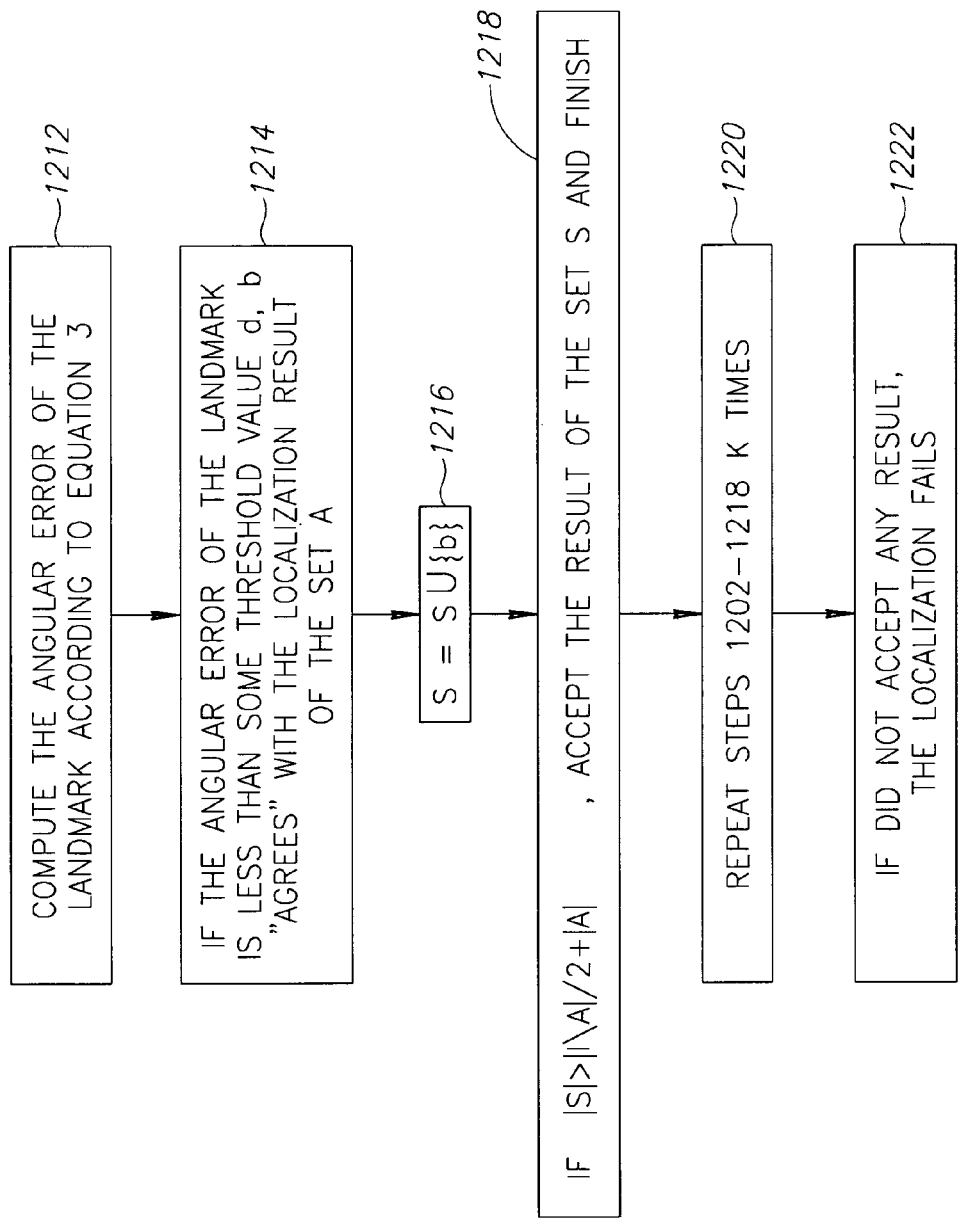

FIG. 12 is a flow chart 1200 illustrating stages of a method for eliminating misidentified landmarks based on the "RANSAC" approach in accordance with embodiments of the present invention. A method according to embodiments of the present invention comprises: Taking randomly 3 landmarks (5 landmarks if the robot moves) out of the set I of n landmarks and denoting this set A 1202, calculating the localization result for the set A, if the robot moves, estimating also the angular velocity 1204, calculating the error value 1206, defining S=A 1208, for each landmark b∈I\A, computing the angle $\beta_{ci}$ according to equation (2) 1210, and computing the angular error according to equation (3) 1212, if the angular error of the landmark is less than some threshold value d, considering that the landmark b agrees with the localization result of the set A 1214, setting S=S∪{b} 1216, if |S|>|I\A|/2+|A|, accepting the result of the set S and finishing 1218, repeating steps 1202-1218 K times 1220, if did not accept any result, the scan fails 1222.

The value of K is chosen in order to ensure with high probability that a set of correct landmarks is found.

According to the inventors, the Complete Approach is advantageous since it ensures finding the result, (if exists). The RANSAC Approach is advantageous for computing the position only up to 2K times and runs at O(n) complexity.

Figure 13:
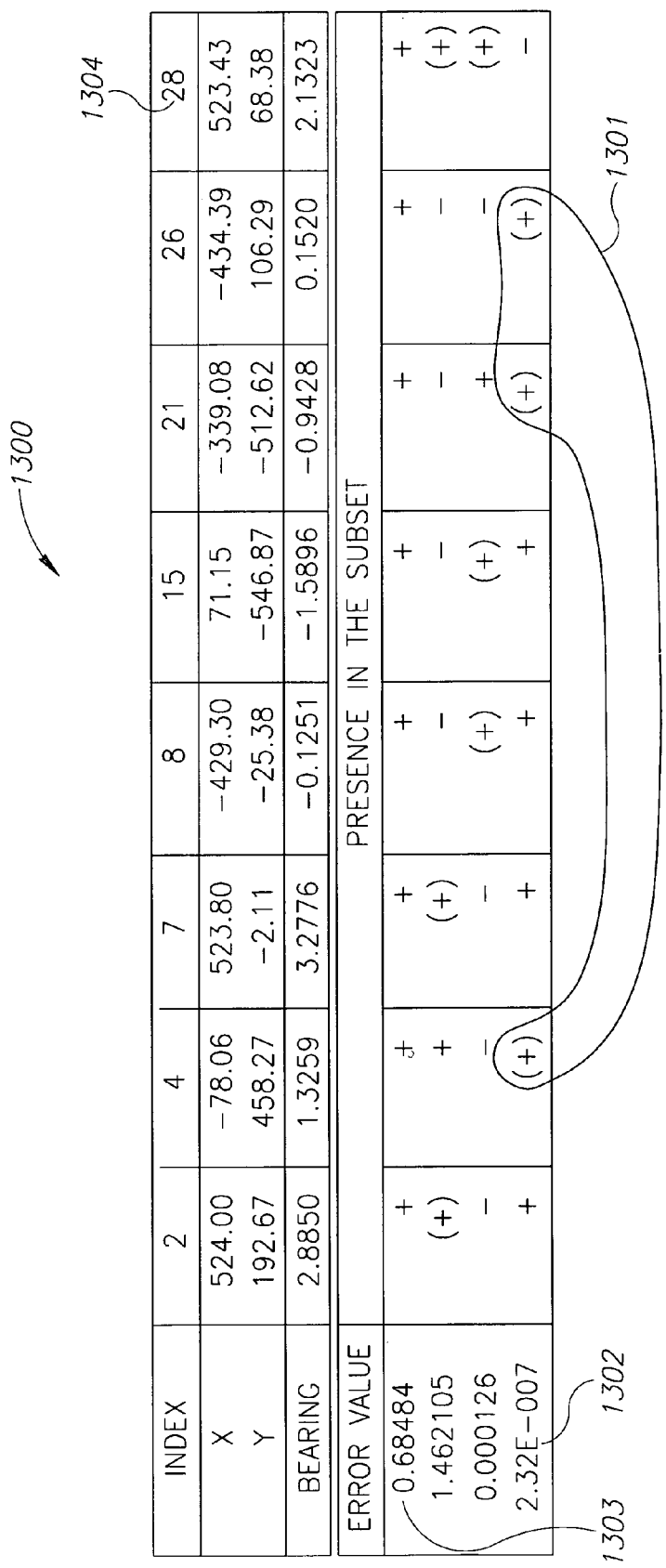
FIG. 13 is a table illustrating results of the method used for eliminating misidentified landmarks based on the "RANSAC" approach FIG. 14 schematically illustrates a robot with a mounted calibration grid used for measures carried out by a camera.

FIG. 13 is a table 1300 illustrating results of a typical run of the RANSAC method. Table 1300 contains a set of landmarks wherein one landmark is misidentified.

The top row 1303 of table 1300 shows a result based on all the observed landmarks that invoked the RANSAC method because of its high error value. In the other rows "(+)" denotes landmarks belonging to randomly selected subsets used for localizing the robot, "+" denotes landmarks whose bearings agree with the computed position and orientation of the robot (i.e., the localization result) and "−" denotes landmarks whose bearings do not agree with the computed position and orientation of the robot.

All landmarks excluding landmark 1304 agree with the localization results. Therefore, the inventors conclude that landmark 1304 is a misidentified landmark. As seen in table 1300, subset 1301 of test 1302 does not include landmark 1304. Therefore the localization result obtained by using subset 1301 is quite accurate and all the landmarks except landmark 1304 agree with the obtained localization result. Thus, it is concluded that landmark 1304 is a misidentified landmark.

To test and verify the validity of the results obtained by using the localization method in accordance with embodiments of the present invention, the inventors compare the position and orientation obtained by the localization system to position and orientation values obtained by a proven method that measures the position and orientation of the robot accurately with a camera.

Figure 14:
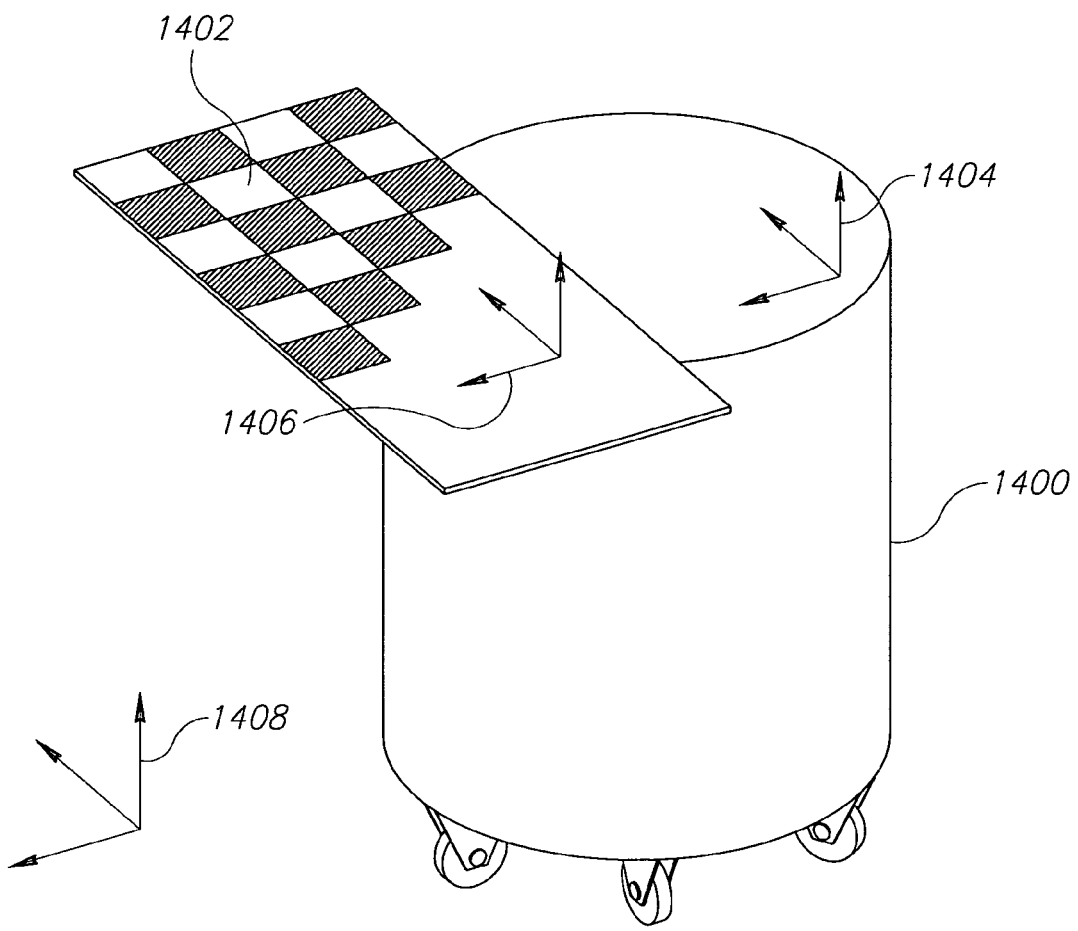

FIG. 14 schematically illustrates a robot 1400 with a mounted calibration grid 1402 and relevant coordinate systems i.e., robot coordinate system 1404, grid coordinate system 1406, and room coordinate system 1408.

As seen, the grid is mounted on the robot, and corresponding measurements of the grid position and orientation are taken for some of the measurements of the localization system.

Figure 15:
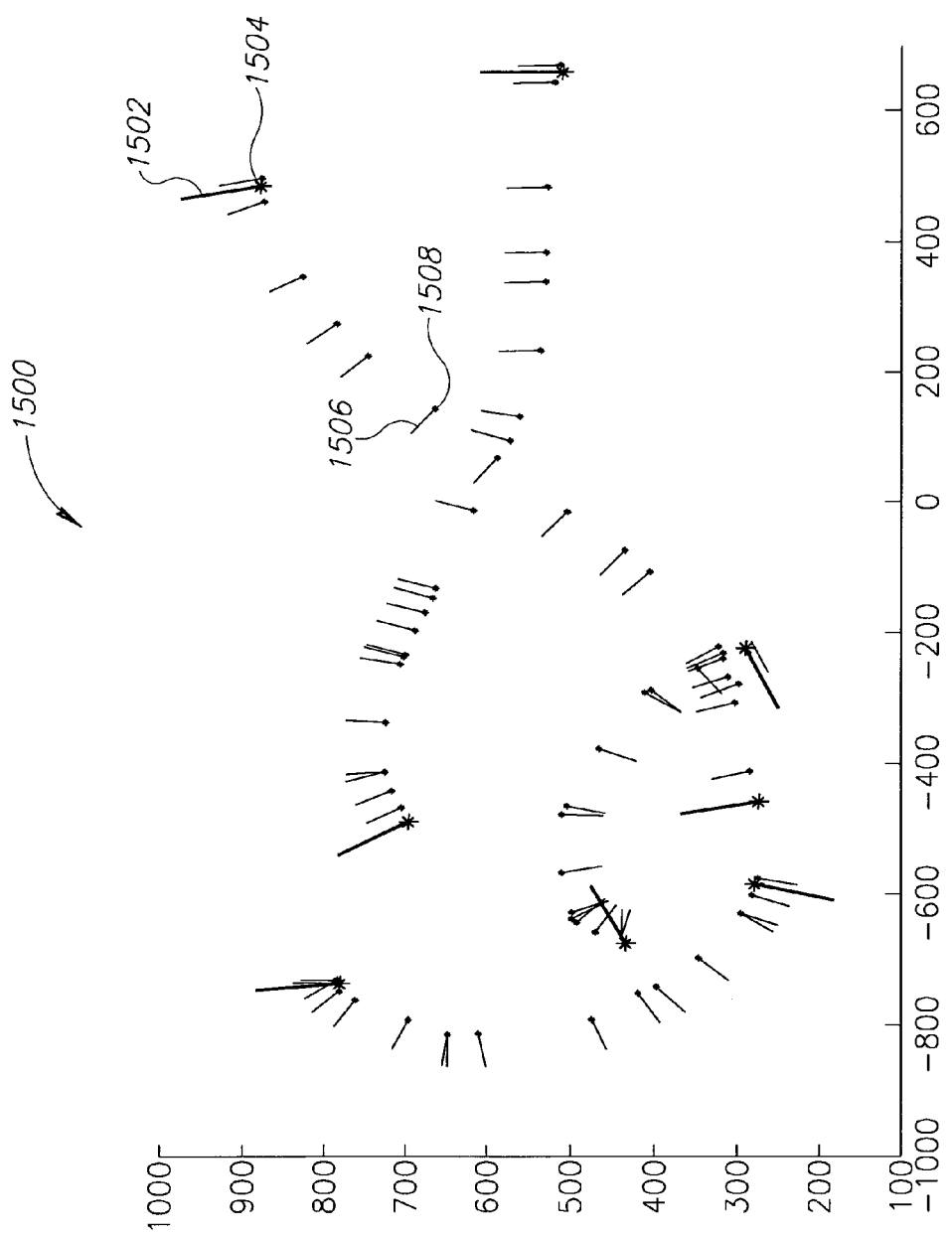
FIG. 15 illustrates the results of an experiment in which the robot positions were measured by the localization method and by a camera.

FIG. 15 illustrates the results 1500 of an experiment in which 15 stationary positions of the robot were measured by the localization method and by a camera.

Seen in FIG. 15, black thick lines 1502 and asterisks 1504 represent measurements obtained by a camera, thin lines 1506 and dots 1508 represent the results obtained by the localization method.

The maximal distance between the results obtained by the localization method and the results obtained by the camera was found to be 1.32 cm, and the maximal angular difference was found to be 0.12°.

Seen in FIG. 5, the results obtained by the localization method during motion of the robot among the stationary points are smooth and frequent.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for estimating the location and orientation of a mobile robot provided with a sensor for measuring bearings of landmarks with respect to the robot, the method comprising:
    using the sensor to measure bearings to a scanned subset of the landmarks, positions of the landmarks being given;
    estimating the location and orientation of the robot with respect to the landmarks of the scanned subset based on the measured bearings;
    calculating a calculated bearing to each of the landmarks of the scanned subset based on the estimated location and orientation of the robot and on the given positions of the landmarks;
    finding a correction function for each of the landmarks such that when the correction function is applied to the bearing measurements to the landmarks of the scanned subset to yield corrected bearings to the landmarks of the scanned subset, when a corrected location of the robot is calculated using the corrected bearings, and when a calculated bearing is calculated using the corrected location, an error value between the measured bearings and the corrected bearings is minimized; and
    applying the found correction functions to bearing measurements to the landmarks to correct bias errors in the bearing measurements by the sensors so as to determine a corrected location and the orientation of the robot.

2. The method as claimed in claim 1, wherein the error value a sum of squares of differences between the measured bearings and the corrected bearings.

3. The method as claimed in claim 1, wherein the bias errors associated with the measured bearings comprise errors caused by a mechanical deficiency of the sensor.

4. The method as claimed in claim 1, wherein the corrected bearing comprises a corrected angle of bearing to each of the landmarks.

5. The method as claimed in claim 4, wherein the correction function denoted $f$ is defined to be continuous and wherein the corrected bearing $\beta_{corr i}$ for each of the landmarks is:

$$\beta_{corr i} = \beta_i + f(\beta_i)$$

where $\beta_i$ is the angle of a measured bearing for each of the landmarks.

6. The method as claimed in claim 1, wherein the given positions of the landmarks were inaccurately determined and the bias errors associated with the measured bearings comprise errors associated with the inaccurate determination of the positions of the landmarks.

7. The method as claimed in claim 6 wherein using the sensor comprises using the sensor to obtain several bearing sets, each bearing set including bearings of at least three landmarks, as the robot changes its position, the method further comprising correcting the given positions by calculating optimal positions of the landmarks that minimize the error value and finding a similarity transformation that when applied to the optimal positions yields transformed positions of the landmarks that are closest to the given positions of the landmarks.

8. The method as claimed in claim 1, wherein the bias errors associated with the measured bearings comprise errors associated with a mechanical deficiency of the sensor and errors associated with inaccurate determination of the positions of the landmarks.

9. The method as claimed in claim 1, wherein the bias errors associated with the measured bearings comprise errors attributed to rotations of the robot.

10. The method as claimed in claim 9, wherein the correction function is used to estimate a rotation speed of the robot that minimizes error values attributed to the rotations of the robot.

11. The method as claimed in claim 1, wherein the bias errors associated with the measured bearings comprise errors attributed to misidentification of the landmarks.

12. The method as claimed in claim 11, comprising:
    determining existence of misidentified landmarks if the error value is above a predetermined threshold;
    for a randomly chosen subset of the landmarks determining the location and the orientation of the robot to be where the error value is minimal;
    calculating the error value for the landmarks that were not included in the subset;
    if for most of the landmarks the calculated error value is below a predetermined value, identifying and disregarding landmarks where the errors were above the predetermined value as the misidentified landmarks, and if for most of the landmarks the error value is above a predetermined value, randomly choosing a new subset of the landmarks and repeating the steps of determining the location and the orientation of the robot to be where the error value is minimal and calculating the error value for the landmarks that were not included in the new subset until the error value for most of the landmarks is below the predetermined value.

* * * * *